(12) United States Patent
Kang et al.

(10) Patent No.: US 9,148,031 B2
(45) Date of Patent: Sep. 29, 2015

(54) APPARATUS AND METHOD FOR VARYING USABLE BAND RANGE OF BATTERY

(71) Applicant: LG CHEM, LTD., Seoul (KR)

(72) Inventors: Jung-Soo Kang, Daejeon (KR);
Sung-Kyun Chang, Daejeon (KR);
Tae-Shin Cho, Daejeon (KR)

(73) Assignee: LG Chem, Ltd., Seoul (KR)

( * ) Notice: Subject to any disclaimer, the term of this patent is extended or adjusted under 35 U.S.C. 154(b) by 342 days.

(21) Appl. No.: 13/727,299

(22) Filed: Dec. 26, 2012

(65) Prior Publication Data

US 2013/0162218 A1    Jun. 27, 2013

(30) Foreign Application Priority Data

Dec. 27, 2011    (KR) .................. 10-2011-0143764

(51) Int. Cl.
*H02J 7/00*    (2006.01)
(52) U.S. Cl.
CPC ............. *H02J 7/0068* (2013.01); *H02J 7/0057* (2013.01); *H02J 7/0078* (2013.01); *H02J 7/0083* (2013.01); *H02J 7/0014* (2013.01)
(58) Field of Classification Search
USPC ................................................ 320/132, 134
See application file for complete search history.

(56) References Cited

U.S. PATENT DOCUMENTS

| 8,497,686 B2* | 7/2013 | Hoshino ...................... 324/435 |
| 2006/0152196 A1* | 7/2006 | Matsumoto et al. .......... 320/132 |
| 2009/0295332 A1 | 12/2009 | Yang et al. |
| 2011/0221394 A1* | 9/2011 | Shigemizu et al. ........... 320/118 |

FOREIGN PATENT DOCUMENTS

| JP | 2006-302567 A | 11/2006 |
| JP | 2011-238526 A | 11/2011 |
| KR | 10-2009-0126099 A | 12/2009 |

* cited by examiner

*Primary Examiner* — Brian Ngo
(74) *Attorney, Agent, or Firm* — Birch, Stewart, Kolasch & Birch, LLP

(57) ABSTRACT

The present invention discloses an apparatus and method for varying a usable band range of a battery. The apparatus for varying a usable band range of a battery according to the present invention comprises a sensor for measuring and outputting an electrical characteristic value of the battery; and a controller for calculating the amount of charged or discharged energy of the battery from the electrical characteristic value and varying a usable band range of the battery that is charged and discharged, to maintain the pre-established amount of usable energy depending on the degradation degree of the battery. In accordance with the present invention, a usable band range of a battery can be established depending on the degradation degree of the battery, thereby improving the life time thereof.

26 Claims, 3 Drawing Sheets

APPARATUS AND METHOD FOR VARYING USABLE BAND RANGE OF BATTERY

TECHNICAL FIELD

The present invention relates to an apparatus and method for varying a usable band range of a battery, and more particularly to an apparatus and method for varying a usable band range of a battery depending on the degradation of the battery.

BACKGROUND ART

A secondary battery has high applicability depending on a product group and excellent electrical characteristics such as high energy density, and thus is commonly used as an electric power source of electric vehicles (EV), hybrid vehicles (HV) and energy storage systems.

A battery tends to gradually degrade in terms of its performance during repeated charging and discharging cycles. Such a degradation of the battery may be confirmed by the gradual decrease in capacity as the charging/discharging cycle of the battery increases.

The degradation of the battery is mainly due to the irreversibility of an electrochemical reaction. That is, when the charging/discharging cycle of the battery increases, the characteristics of a substance which participates in an electrochemical reaction is deteriorated by an aging effect, so the electrochemical reaction is not reversibly carried out during a charging and discharging process.

As well known in the art, the degradation of the battery brings about the decrease of usable electrical energy, thereby decreasing the use time of an instrument or device which is supplied with the energy from the battery and deteriorating output characteristics. For example, in the case a battery of an electrical vehicle is degraded, the amount of distance driven by one charge cycle decreases under the same condition. Therefore, it is necessary to apply a battery-related technology capable of maintaining the performance of an electrical vehicle regardless of the degradation of a battery.

Meanwhile, interest of a smart grid has been increasing recently due to the depletion of fossil fuels. The smart grid is based on a dispersion power management model, and stores dump power in a bulk power storage apparatus to use the remaining power in a power system later. Since a power storage apparatus has characteristics of having to be used for a long period once it is installed, it is important for a battery used in the power storage apparatus to maintain uniform output characteristics for a long period, rather than have high output characteristics, unlike a battery used in an electrical vehicle. However, if a charging and discharging process is repeated under the condition of an appointed voltage range, the battery capacity decreases, thereby failing to maintain constant output characteristics thereof. Accordingly, there is a need for maintaining a constant battery capacity regardless of the degradation of the battery.

DISCLOSURE

Technical Problem

The present invention is designed to solve the problems of the prior art, and therefore, it is an object of the present invention to provide an apparatus and method for varying a usable band range of a battery as the battery is degraded.

Technical Solution

In order to accomplish the above object, in accordance with one aspect of the present invention, there is provided an apparatus for varying a usable band range of a battery, comprising a sensor for measuring and outputting an electrical characteristic value of the battery; and a controller for calculating an amount of charged or discharged energy of the battery from the electrical characteristic value, and varying a usable band range of the battery that is charged and discharged so as to maintain the pre-established amount of usable energy depending on the degradation degree of the battery.

Preferably, the controller varies a usable band range of the battery that is charged and discharged, when a difference value between the calculated amount of energy and the pre-established amount of usable energy is greater than a critical value. In this case, the controller may vary a usable band range of the battery that is charged and discharged, with reference to a look-up table which defines a variable degree of the usable area depending on the difference value.

Preferably, the controller controls the charging or discharging of the battery depending on the varied usable band range.

In accordance with an embodiment of the present invention, the usable band range is determined by a voltage band of the battery, and the controller extends the voltage band to maintain the pre-established amount of usable energy. In this case, the voltage band may increase as the upper limit of the voltage band increases, and/or the lower limit thereof decreases.

In accordance with another embodiment of the present invention, the usable band range is determined by a State of Charge (SOC) band of the battery, and the controller extends the SOC band to maintain the pre-established amount of usable energy. In this case, the SOC band may increase as the upper limit of the SOC band increases, and/or the lower limit thereof decreases.

In the present invention, the sensor may comprise a current measuring device, a voltage measuring device, and/or a thermometer.

Preferably, the apparatus for varying a usable band range of a battery according to the present invention further comprises a memory unit for storing parameters used to define the electrical characteristic value, the degradation degree and the varied usable band range.

In accordance with another aspect of the present invention, there is provided a method for varying a usable band range of a battery, comprising (a) receiving a signal for an electrical characteristic value of the battery; (b) calculating an amount of charged or discharged energy of the battery from the received electrical characteristic value; and (c) varying a usable band range of the battery that is charged and discharged, so as to maintain the pre-established amount of usable energy depending on the degradation degree of the battery.

Advantageous Effects

In accordance with the present invention, a usable band range of a battery can be varied depending on the degradation degree of the battery, thereby improving the life time thereof.

Also, in accordance with the present invention, a usable band range of a battery can be varied depending on the available period of the battery, thereby maintaining the same charging/discharging capacity and output efficiency thereof.

DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
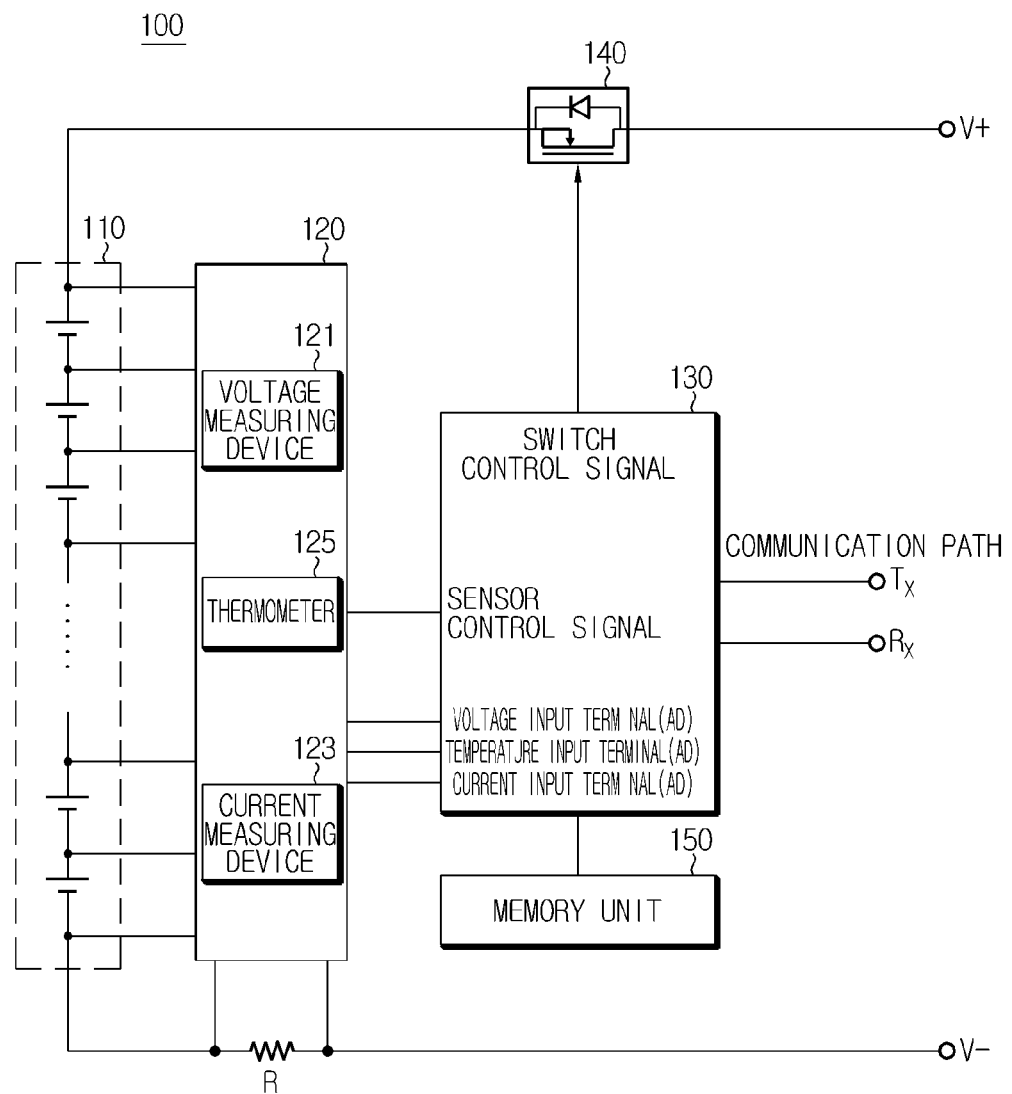
FIG. 1 is a block diagram schematically showing the configuration of an apparatus for varying a usable band range of a battery according to an embodiment of the present invention.

FIG. 1 is a block diagram schematically showing the configuration of an apparatus 100 for varying a usable band range of a battery according to an embodiment of the present invention.

Referring to FIG. 1, the apparatus 100 for varying a usable band range of a battery according to the present invention comprises a sensor 120 and a controller 130.

A battery 110 shown in FIG. 1 comprises at least one cell, and the kind of the cell is not particularly limited. The battery may be a secondary battery capable of being recharged, for example, a lithium ion battery, a lithium polymer battery, a nickel-cadmium battery and a nickel-zinc battery.

The high-potential terminal (V+) and the low-potential terminal (V−) of the battery 110 may be connected to a power supply unit for supplying a charging power or a load where a power discharged from the battery is supplied. Herein, for simplification, the power supply unit and the load are not shown in FIG. 1. The examples of the power supply unit may include an available power grid, a bulk power storage apparatus, a generator for vehicles, an external charger, and an inner charger equipped with a battery, but the present invention is not limited thereto. Also, the examples of the load may include a motor for electric vehicles or hybrid vehicles, a DC to DC converter and an available power grid, but is not limited thereto.

The sensor 120 measures an electrical characteristic value of the battery 110 to output to the controller 130 as a signal exhibiting the electrical characteristic value. The electrical characteristic value which is used herein refers to the voltage of the battery 110, a current which flows in a wire during a charging and discharging process, the temperature of the battery 110, or the like. In the present invention, such an electrical characteristic value is used to calculate charging or discharging capacity or check the state of the battery 110 such as the estimation of SOC. For this, the sensor 120 measures the electrical characteristic value of the battery 110 by using the controlling signals of the controller 130. The electrical characteristic value of the battery 110 may be periodically measured at the pre-established intervals or may also be measured by the request of the upper system for managing the controller 130 or a user.

Preferably, the sensor 120 comprises a voltage measuring device 121, a current measuring device 123, and/or a thermometer 125. The voltage measuring device 121 measures the total voltage of the battery 110, and/or the voltage of each cell included in the battery 110, and outputs a voltage signal corresponding to the measurement to the controller 130. The measuring device 123 measures the extent of a current which flows in a resistance device (R) connected between the battery 110 and a power supply unit or load during charging and discharging of the battery 110, and outputs a current signal corresponding to the measurement to the controller 130. The thermometer 125 measures the temperature of the battery 110 during charging and discharging of the battery 110 and a temperature signal corresponding to the measurement to the controller 130. Since the performance of the battery 110 is varied depending on its temperature, the measurement of the temperature of the battery 110 among battery characteristic values allows for a more accurate check of the state of the battery.

The sensor 120 is not limited to the voltage measuring device 121, the current measuring device 123, and the thermometer 125 shown in FIG. 1, and may comprise any other measuring devices capable of sensing the electrical characteristics of the battery 110.

The controller 130 calculates an amount of charged or discharged energy of the battery from the signals exhibiting the electrical characteristic values output by the sensor 120. The calculation of the amount of energy may be carried out by means of a current integration method. In the current integration method, an integrated current is the amount of a charged or discharged current which is obtained as a sum of all current values measured by the sensor 120 at a certain voltage section or a time domain. The specific explanation of the current integration method is omitted herein since it is well known in the art.

The integrated current value is fundamentally calculated by the voltage and current measurements of the battery 110, but may be more accurately calculated by considering the temperature of the battery 110 during a charging and discharging process since the battery 110 is affected by its temperature.

The controller 130 varies a usable band range of a battery 110 that is charged and discharged so as to maintain the pre-established amount of usable energy depending on the degradation degree of the battery 110.

Generally, a battery has a physical upper and lower limit in a chargeable or dischargeable range, but does not charge or discharge to the physical upper or lower limit in actuality. That is, after establishing a usable band range of the battery properly within in the physical upper and lower limit thereof in terms of safety, life time and energy efficiency, the battery is charged and discharged within the usable band range.

In the present invention, the lower limit of the usable band range is established to be higher than a physical discharging limit, and the upper limit thereof is established to be lower than a physical charging limit. The establishment of the usable band range may be varied depending on the characteristics, use environment, the desired charging/discharging capacity and energy output of the battery. Herein, a battery is said to be called completely discharged (or fully discharged) when the state of the battery reaches the lower limit of the established usable band range during a discharging process, and is called completely charged (or fully charged) when the state of the battery reaches the upper limit of the established usable band range during a charging process).

If the battery 110 is used for a short time, and a battery is charged or discharged within the early established usable band range, it can sufficiently have the desired charging/discharging capacity and energy output. However, as the battery 110 is degraded, even if the battery is fully charged or discharged within the established usable band range, it fails to have the desired charging/discharging capacity and energy output. Accordingly, the controller 130 varies the usable band range of the battery 110 that is charged and discharged, thereby constantly maintaining the charging/discharging capacity and output of the battery to be the pre-established amount of usable energy.

Preferably, the controller 130 calculates the amount of charged or discharged energy of the battery 110 by the entire usable band range of the battery 110. It is more accurate to calculate the amount of charged or discharged energy by the entire established usable band range, rather than to calculate using electrical characteristic values measured by a partial usable band range of the battery 110.

For example, when calculating the amount of charged energy, an integrated current is calculated using current measurements obtained during a charging process from a full discharging point to a full charging point. Also, when calculating the amount of discharged energy, an integrated current is calculated using current measurements obtained during a discharging process from a full charging point to a full discharging point. At this time, it is preferred that the current measurements are successively measured without a break during a charging or discharging process for more accurate calculation of the amount of charged or discharged energy.

Preferably, the controller 130 calculates a difference value between the calculated amount of energy and the pre-established amount of usable energy, and varies the usable band range of the battery 110 that is charged and discharged when the difference value is greater than a critical value.

The electrical characteristic values output by the sensor 120 encompass an error depending on the charging state of the battery 110, the kind of the load, use environment and the like. Therefore, an error may also occur in the calculation of the amount of charged or discharged energy using the electrical characteristic values.

Accordingly, it is preferred to calculate a difference value between the calculated amount of energy and the pre-established amount of usable energy, and then to vary the usable band range of the battery 110 when the difference value is greater than a critical value. The critical value may be established as several values considering a certain ratio with respect to the pre-established amount of usable energy and the accuracy of the sensor 120.

In the present invention, the controller 130 varies the usable band range of the battery 110 to maintain the pre-established amount of usable energy. The variation of the usable band range of the battery that is charged and discharged may be performed with reference to a look-up table which defines a variable degree of the usable band range depending on the difference value.

The usable band range that needs to be varied to maintain the same amount of energy may be variable depending on the characteristics of the battery 110 and the number of repeated charging/discharging cycles.

Therefore, after preparing the look-up table using data obtained from experimentations through the actual use of a battery, the controller 130 may vary the usable band range of the battery with reference to the prepared look-up table.

Also, after the usable band range of the battery 110 is varied, the controller 130 controls the charging and discharging of the battery in the varied usable band range. That is, after connecting the battery 110 to a power supply unit, the controller 130 controls a switch 140 to start charging when the state of the battery 110 corresponds to the lower limit of the varied usable band range, and to end charging when the state of the battery 110 corresponds to the upper limit of the varied usable band range. Also, after connecting the battery 110 to a load, the controller 130 controls a switch 140 to start discharging only when the state of the battery 110 exceeds the lower limit of the varied usable band range, and to end charging when the state of the battery 110 corresponds to the lower limit of the varied usable band range.

In an embodiment of the present invention, the usable band range is determined by a voltage band of the battery 110, and the controller 130 extends the voltage band to maintain the pre-established amount of usable energy.

The voltage of the battery 110 during charging increases due to its nature thereof. Accordingly, the charging state of the battery 110 may be detected by measuring each voltage at both ends of the battery 110, and the voltage band of the battery 110 may be used to establish a usable band range which is the basis of the charging and discharging control of the battery 110.

Figure 2:
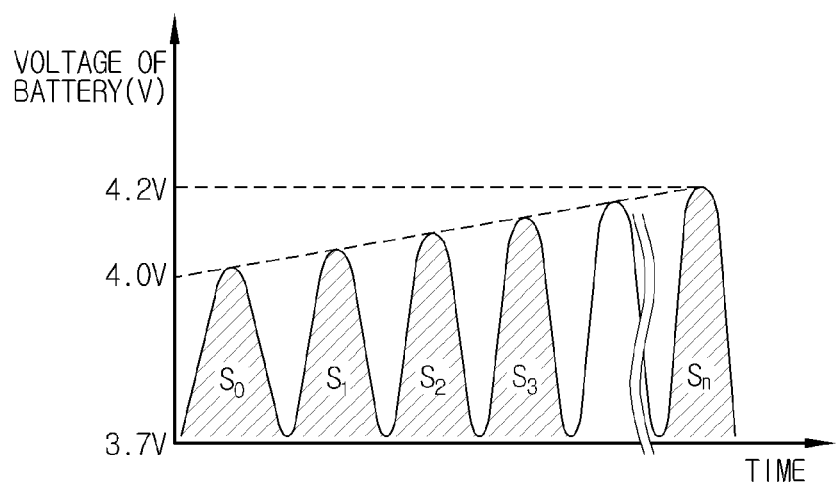
FIG. 2 represents a graph showing the variation of a usable band range of a battery depending on a voltage, as the charging/discharging cycle increases.

FIG. 2 represents a graph showing the variation of the usable band range of the battery 110 depending on a voltage, as the charging/discharging cycle of the battery 110 increases.

Referring to FIG. 2, the horizontal axis represents a time passage, and the vertical axis, a voltage value exhibiting the usable band range of the battery. FIG. 2 illustrates an embodiment of the present invention in which the degradation degree of the battery increases as time passes, wherein a battery whose total capacity is 40 Ah is used and charged to 20 Ah, and its full discharging voltage is established to 3.7 V. In the first charging/discharging cycle, the charging of the battery starts at 3.7 V, and when an amount of charged energy reaches 20 Ah, the voltage of the battery is 4.0 V. Accordingly, the initial usable voltage band is the range of 3.7 V to 4.0 V.

As the battery degrades over time, the amount of charged or discharged energy at a band of 3.7 V to 4.0 V does not reach 20 Ah. In this circumstance, the controller 130 varies the upper limit of the voltage band so that the amount of charged or discharged energy reaches 20 Ah. Thereby, the amount of charged or discharged energy ($S_1 \sim S_n$) at each varied band is maintained to the initial amount of charged or discharged energy ($S_0$), 20 Ah, as shown in FIG. 2.

Although FIG. 2 illustrates that an amount of charged or discharged energy is maintained by the variation of only the upper limit of the voltage band, the controller 130 may extend the voltage band by lowering the lower limit thereof, or by the combination of raising the upper limit of the voltage band and lowering the lower limit thereof. It is apparent that the variation of the voltage band should be made without deteriorating the safety of the battery.

In accordance with another embodiment of the present invention, the usable band range is determined by a SOC band of the battery 110, and the controller 130 extends the SOC band to maintain the pre-established amount of usable energy.

Figure 3:
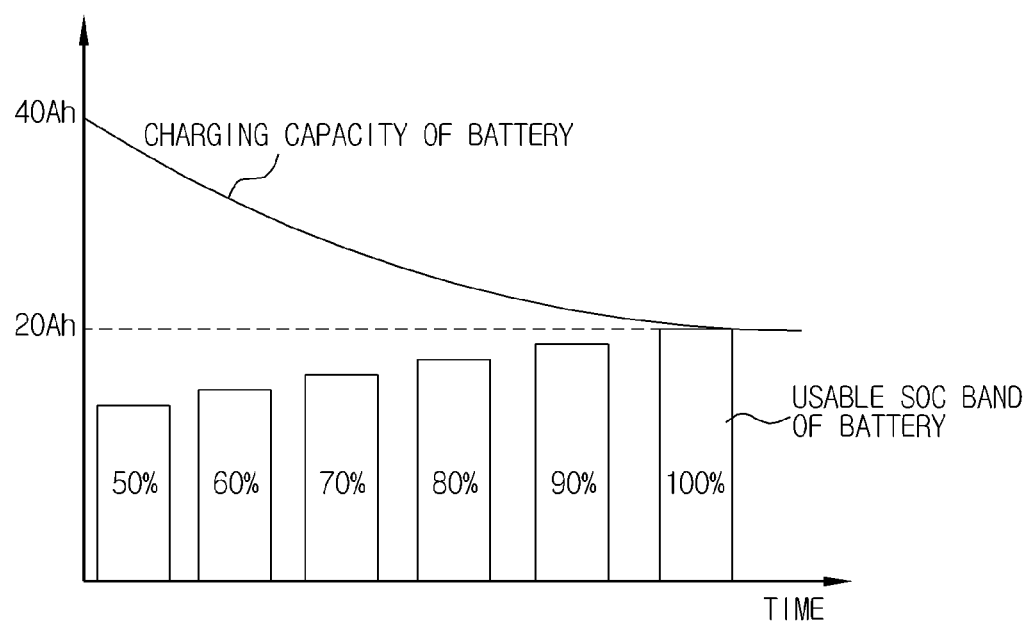
FIG. 3 represents a graph showing the variation of a usable band range of a battery depending on an SOC, as the charging/discharging cycle increases.

FIG. 3 represents a graph showing the variation of a usable band range of a battery depending on an SOC, as the charging/discharging cycle increases.

Referring to FIG. 3, the horizontal axis represents a time passage, and the vertical axis represents a charging capacity of the battery 110. In the graph of FIG. 3, the usable SOC bands of the battery are represented together with the charging capacity of the battery. The SOC refers to a parameter representing an amount of the existing charged current based on the total chargeable capacity in percentage.

Also, in this embodiment, a battery whose total capacity is 40 Ah is used and charged to 20 Ah. The SOC band of the battery is established so that the lower limit of its usable band range is 0%, which represents a fully discharged state. Accordingly, when the battery is charged to 20 Ah, a section corresponding to 0% to 50% of the SOC band is established as the usable band range thereof.

As the battery degrades over time, an amount of charged or discharged energy at a section corresponding to 0% to 50% of the SOC band does not reach 20 Ah. In this circumstance, the controller 130 varies the upper limit of the SOC band so that the amount of charged or discharged energy reaches 20 Ah. Thereby, the amount of charged or discharged energy at each varied SOC band is maintained to the initial amount of charged or discharged energy, 20 Ah, as shown in FIG. 3.

Although FIG. 3 illustrates that an amount of charged or discharged energy is maintained by the variation of only the upper limit of the SOC band, the controller 130 may extend the SOC band by lowering the lower limit thereof. In this case, it is apparent that the initial lower limit of the usable SOC band range should be greater than 0%. Further, the extension of the SOC band may be performed by the combination of raising the upper limit of the SOC band and lowering the lower limit thereof.

Preferably, the apparatus 100 for varying a usable band range of a battery according to the present invention further comprises a memory unit for storing parameters used to define the electrical characteristic value, the amount of usable energy and the varied usable band range. The memory unit 150 may be a bulk storage medium, for example, semiconductor devices known to be capable of recording or removing data, such as RAM, ROM, EEPROM and flash memory, and a hard disk.

In the present invention, a device used for the switch 140 may be a semiconductor device such as a mechanical relay switch and a field effect transistor (FET), but the present invention is not limited thereto. Therefore, it is understood that the switch 140 includes all switch devices and the structures thereof capable of connecting the battery 100 to a power supply unit or load.

The controller 130 may be a microprocessor capable of operating programmable logic codes which are configured to control the apparatus 100 for varying a usable band range of a battery according to the present invention, or an application specific integrated circuit which is configured as a logic circuit to control the apparatus 100 for varying a usable band range of a battery according to the present invention, but the present invention is not limited thereto.

Also, the control of charging and discharging by the controller 130 is not limited to the controlling method using the switch as shown in FIG. 1, and it should be understood to include all known controlling methods which may be applied in charging and discharging the battery 110 by a person having ordinary skill in the art.

In accordance with the present invention, the sensor 120, the controller 130 and the memory unit 150 may be integrated by the components of a battery management system (BMS) or may be configured as an individual circuit. In the former case, it is apparent to a person having ordinary skill that the controller 130 corresponds to a microprocessor performing the control logic of the BMS.

In accordance with another aspect of the present invention, the present invention further provides a method for varying a usable band range of a battery by using the mentioned apparatus 100 for varying a usable band range of a battery. For components or terms which are already specifically explained above, repetitive explanation will be omitted.

Figure 4:
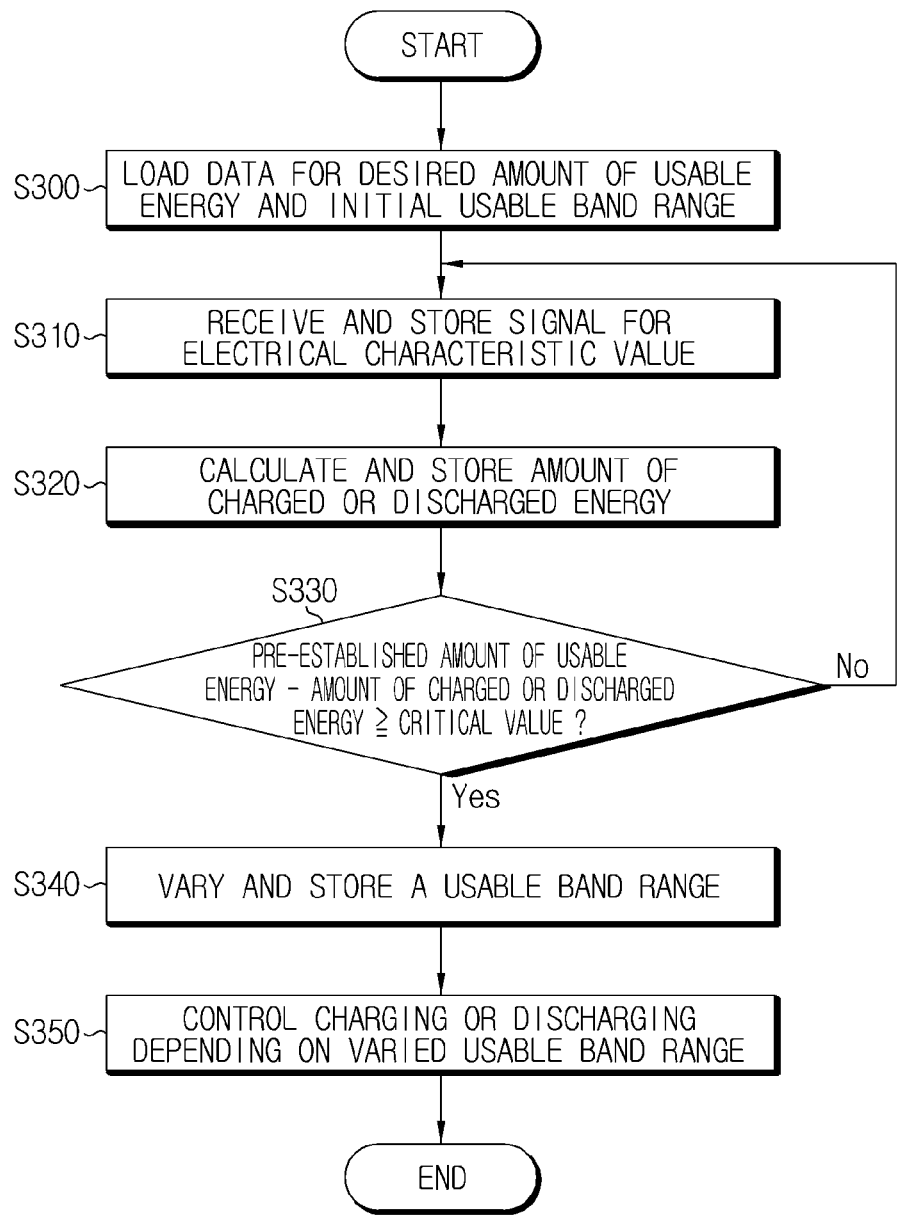
FIG. 4 is a flow chart illustrating the procedure of the method for varying a usable band range of a battery according to the present invention.

FIG. 4 is a flow chart illustrating the procedure of the method for varying a usable band range of a battery according to the present invention.

First, in the S300 step, the controller 130 loads information data for the desired amount of usable energy and an initial usable band range from the memory unit 150. The amount of usable energy is established by the manufacturer of the battery 110 and may be varied depending on the performance or capacity of the battery 110. Also, the initial usable band range may be variously established depending on the amount of usable energy. As mentioned above, the usable band range may be established by a voltage band or SOC band, and also it is possible to establish the upper limit of the usable band range, the lower limit thereof, or both of them.

Next, in the S310 step, the controller 130 receives a signal for an electrical characteristic value from the sensor 120. The electrical characteristic value includes measurements for the voltage, current and/or temperature of the battery 110. This step may be periodically performed at the pre-established intervals or may be performed by the request of the upper system for managing the controller 130 or a user.

Then, in the S320 step, the controller 130 calculates an amount of charged or discharged energy of the battery 110 from the received electrical characteristic value. The amount of charged or discharged energy is calculated by the entire usable band range of the battery. The calculation of the amount of charged or discharged energy may be performed by the same method as mentioned above, and thus repetitive explanation is omitted.

Preferably, the method for varying a usable band range of a battery according to the present invention comprises the step of comparing the calculated amount of charged or discharged energy with the pre-established amount of usable energy to determine whether a difference between the calculated amount and the pre-established amount is greater than or equivalent to a critical value (S330).

As the battery 110 degrades, the calculated amount of energy will decrease to be lower than the initially established amount of energy. That is, the established amount of energy cannot be maintained within the initially established usable band range, and it is necessary to check whether such a difference is resulted from the decrease of an actual charging capacity within the established usable band range or from a measuring error of the sensor 120 when calculating the amount of a charged or discharged energy. Accordingly, it is preferred that the step S330 of determining whether the difference is greater than or equivalent to a critical value is comprised in the present invention.

If a difference between the calculated amount of charged or discharged energy and the pre-established amount of usable energy is lower than a critical value (corresponding to "No" of the step S330), the subsequent flow is to return to the S310 step and repeat the procedure of receiving a signal for an electrical characteristic value and calculating an amount of charged or discharged energy.

On the contrary, if a difference between the calculated amount of charged or discharged energy and the pre-established amount of usable energy is not lower than a critical value (corresponding to "Yes" of the step S330), the controller 130 varies a usable band range of the battery 110 that is charged and discharged, so as to maintain the pre-established amount of usable energy (S340).

If the usable band range is established by a voltage band of the battery 110, the pre-established amount of usable energy may be maintained by raising the upper limit of the voltage band, or by lowering the lower limit thereof, or by combining raising the upper limit of the voltage band and lowering the lower limit thereof.

Meanwhile, if the usable band range is established by an SOC voltage band of the battery 110, the pre-established amount of usable energy may be maintained by raising the upper limit of the SOC band, or by lowering the lower limit thereof, or by the combination of raising the upper limit of the SOC band and lowering the lower limit thereof.

The variation of the usable band range may be performed with reference to a look-up table which defines a variable degree of the usable band range depending on the difference value. For example, when an initially established amount of usable energy is 20 Ah, a critical value is established to 0.5 Ah. Also, a look-up table defining that the increase of a voltage band by 0.05 V is required to raise an amount of charged or discharged energy by 0.5 Ah, as results obtained from experimentations, may be stored in the memory unit 150. Accordingly, if the calculated amount of charged or discharged energy is changed from 20 Ah to 19.5 Ah, the controller 130 may vary the upper limit of the usable band range from 4.0 V to 4.05 V.

The above-mentioned illustration is just only one example of the variation of the usable band range with reference to a look-up table, and thus it is apparent that more examples of variation of the usable band range by means of the increase of the upper limit, the decrease of the lower limit, or a combination thereof may be made with variable look-up tables obtained from many experimentations.

Preferably, the method for varying a usable band range of a battery according to the present invention further comprises the step S350 that the controller 130 controls the charging or discharging of the battery 110 to correspond to the varied usable band range.

When the battery 110 is connected to a power supply unit for supplying a charging power, the controller 130 controls the switch 140 for connecting the battery 110 to the power supply unit, thereby allowing charging to be carried out within the varied usable band range. Similarly, when the battery 110 is connected to a load where a power discharged from the battery is supplied, the controller 130 controls the switch 140 for connecting the battery 110 to the load, thereby allowing discharging to be carried out within the varied usable band range. Such a control of the switch 140 is just one example of a method for controlling charging or discharging, and various other charging/discharging-controlling methods may be applied by a person having ordinary skill as mentioned above.

In addition, it is preferred that the method for varying a usable band range of a battery according to the present invention further comprises the step that the controller 130 stores parameters used to define the electrical characteristic value, the amount of usable energy and the varied usable band range in the memory unit 150. The storage of each datum may be carried out in every step.

In accordance with the present invention, a usable band range of a battery can be varied depending on the degradation degree of the battery, thereby improving the life time thereof. Also, a usable band range of a battery can be varied depending on the available period of the battery, thereby maintaining the same charging/discharging capacity and output efficiency thereof.

Meanwhile, each component for the apparatus 100 for varying a usable band range of a battery according to the present invention shown in FIG. 1 should be understood as a logically distinguished component, rather than a physically distinguished component.

In other words, each component corresponds to an element logically distinguished for realizing the spirit of the present invention, and should be understood as being included in the scope of the present invention if it may realize its logic function though it is separately implemented or integrated with another component, and components realizing their same or similar function should be understood as being included in the scope of the present invention even though their designations are different.

INDUSTRIAL APPLICABILITY

The present invention has been described in detail by specific embodiments and drawings. However, it should be understood that the specific embodiments and drawings are given by way of illustration only, not intending to limit the present invention, and thus various changes and modifications may be made by those skilled in the art to the invention which also fall within the scope of the invention as defined as the appended claims.

What is claimed is:

1. An apparatus for varying a usable band range of a battery, the apparatus comprising:
   a sensor configured to measure and output an electrical characteristic value of the battery; and
   a controller for configured to:
      calculate an amount of charged or discharged energy of the battery from the electrical characteristic value, and
      vary the usable band range of the battery that is charged and discharged so as to maintain a pre-established amount of usable energy depending on a degradation degree of the battery,
   wherein the usable band range is a band range including a lower limit corresponding to when to start charging the battery and an upper limit corresponding to when to end charging of the battery.

2. The apparatus for varying a usable band range of a battery according to claim 1, wherein the controller performs the calculation of the amount of charged or discharged energy of the battery by an entire usable band range of the battery.

3. The apparatus for varying a usable band range of a battery according to claim 1, wherein the controller varies the usable band range of the battery that is charged and discharged, when a difference value between the calculated amount of energy and the pre-established amount of usable energy is greater than a critical value.

4. The apparatus for varying a usable band range of a battery according to claim 3, wherein the controller varies the usable band range of the battery that is charged and discharged, with reference to a look-up table which defines a variable degree of the usable area depending on the difference value.

5. The apparatus for varying a usable band range of a battery according to claim 1, wherein the controller controls the charging of the battery depending on the varied usable band range.

6. The apparatus for varying a usable band range of a battery according to claim 1, wherein the controller controls the discharging of the battery depending on the varied usable band range.

7. The apparatus for varying a usable band range of a battery according to claim 1, wherein the usable band range is determined by a voltage band of the battery, and the controller extends the voltage band to maintain the pre-established amount of usable energy.

8. The apparatus for varying a usable band range of a battery according to claim 7, wherein the controller extends the voltage band by raising the upper limit of the voltage band, by lowering the lower limit of the voltage band, or by a combination thereof.

9. The apparatus for varying a usable band range of a battery according to claim 1, wherein the usable band range is determined by a State of Charge (SOC) band of the battery, and the controller extends the SOC band to maintain the pre-established amount of usable energy.

10. The apparatus for varying a usable band range of a battery according to claim 9, wherein the controller extends the SOC band by raising the upper limit of the SOC band, by lowering the lower limit of the SOC band, or by a combination thereof.

11. The apparatus for varying a usable band range of a battery according to claim 1, wherein the sensor is a current measuring device or a voltage measuring device.

12. The apparatus for varying a usable band range of a battery according to claim 11, wherein the sensor further comprises a thermometer for measuring the temperature of the battery during the charging and discharging of the battery.

13. The apparatus for varying a usable band range of a battery according to claim 1, which further comprises a memory unit for storing parameters used to define the electrical characteristic value, the amount of usable energy and the varied usable band range.

14. A method for varying a usable band range of a battery, the method comprising:
 (a) receiving a signal for an electrical characteristic value of the battery;
 (b) calculating an amount of charged or discharged energy of the battery from the received electrical characteristic value; and
 (c) varying a usable band range of the battery that is charged and discharged, so as to maintain a pre-established amount of usable energy depending on a degradation degree of the battery,
 wherein the usable band range is a band range including a lower limit corresponding to when to start charging the battery and an upper limit corresponding to when to end charging of the battery.

15. The method for varying a usable band range of a battery according to claim 14, wherein in step (b), the calculation of the amount of charged or discharged energy of the battery is performed by an entire usable band range of the battery.

16. The method for varying a usable band range of a battery according to claim 14, which further comprises calculating a difference value between the calculated amount of energy and the pre-established amount of usable energy,
 wherein in step (c), the usable band range of the battery that is charged and discharged is varied when a difference value between the calculated amount of energy and the pre-established amount of usable energy is greater than a critical value.

17. The method for varying a usable band range of a battery according to claim 16, wherein in step (c), the usable band range of the battery that is charged and discharged is varied with reference to a look-up table which defines a variable degree of the usable area depending on the difference value.

18. The method for varying a usable band range of a battery according to claim 14, which further comprises controlling the charging of the battery depending on the charging capacity of the battery corresponding to the varied usable band range.

19. The method for varying a usable band range of a battery according to claim 14, which further comprises controlling the discharging of the battery depending on the discharging capacity of the battery corresponding to the varied usable band range.

20. The method for varying a usable band range of a battery according to claim 14, wherein the usable band range is determined by a voltage band of the battery, and in step (c), the voltage band is extended to maintain the pre-established amount of usable energy.

21. The method for varying a usable band range of a battery according to claim 20, wherein in step (c), the voltage band is extended by the increase of the upper limit of the voltage band, the decrease of the lower limit of the voltage band, or a combination thereof.

22. The method for varying a usable band range of a battery according to claim 14, wherein the usable band range is determined by a State of Charge (SOC) band of the battery, and in step (c), the SOC band is extended to maintain the pre-established amount of usable energy.

23. The method for varying a usable band range of a battery according to claim 22, wherein in step (c), the SOC band is extended by the increase of the upper limit of the SOC band, the decrease of the lower limit of the SOC band, or a combination thereof.

24. The method for varying a usable band range of a battery according to claim 14, wherein the electrical characteristic value is a measurement value for the current or the voltage of the battery.

25. The method for varying a usable band range of a battery according to claim 24, wherein the electrical characteristic value further comprises a measurement value for the temperature of the battery.

26. The method for varying a usable band range of a battery according to claim 14, which further comprises storing parameters used to define the electrical characteristic value, the amount of usable energy and the varied usable band range.

* * * * *